United States Patent
Cao et al.

(10) Patent No.: US 12,451,833 B2
(45) Date of Patent: Oct. 21, 2025

(54) DYNAMIC PROTECTION METHOD AND SYSTEM FOR LINEAR VIBRATION MOTOR, AND RELATED DEVICE

(71) Applicant: AAC Acoustic Technologies (Shanghai) Co., Ltd., Shanghai (CN)

(72) Inventors: Mengya Cao, Shanghai (CN); Zengyou Meng, Shanghai (CN); Yajun Zheng, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 165 days.

(21) Appl. No.: 18/401,281

(22) Filed: Dec. 29, 2023

(65) Prior Publication Data
US 2025/0015745 A1    Jan. 9, 2025

Related U.S. Application Data

(63) Continuation of application No. PCT/CN2023/105798, filed on Jul. 5, 2023.

(51) Int. Cl.
*H02P 29/032* (2016.01)
*H02P 25/032* (2016.01)

(52) U.S. Cl.
CPC .......... *H02P 29/032* (2016.02); *H02P 25/032* (2016.02)

(58) Field of Classification Search
CPC ....... H02P 29/032; H02P 25/032; H02P 25/06
USPC .................................................. 318/114, 558
See application file for complete search history.

(56) References Cited

U.S. PATENT DOCUMENTS 8,736,202 B2 * 5/2014 Murata ................... H02P 25/06
318/400.06

* cited by examiner

*Primary Examiner* — David Luo
(74) *Attorney, Agent, or Firm* — Wiersch Law Group

(57) ABSTRACT

Provided is a dynamic protection method and system for a linear vibration motor. The method includes S1: calculating original voltage signal according to initial gain coefficient; S2: processing the original voltage signal of each frame, and obtaining driving voltage signal; S3: loading the driving voltage signal to the linear vibration motor to drive the linear vibration motor to operate; S4: collecting acceleration signal of the linear vibration motor, and analyzing whether the acceleration signal is abnormal to determine operating state of the linear vibration motor; if yes, performing S5; and if not, performing S6; S5: adjusting current gain coefficient of current signal frame to new gain coefficient; and S6: determining whether the current signal frame is the last signal frame. With this method, voltage parameter can be automatically adjusted for the linear vibration motor to reduce abnormal noise to prolong the service life of the device.

8 Claims, 12 Drawing Sheets

DYNAMIC PROTECTION METHOD AND SYSTEM FOR LINEAR VIBRATION MOTOR, AND RELATED DEVICE

TECHNICAL FIELD

The present disclosure relates to the technical field of linear vibration motors, and in particular, to a dynamic protection method and system for a linear vibration motor, a computer device, and a computer storage medium.

BACKGROUND

A linear motor is a transmission apparatus that directly converts electrical energy into linear motion mechanical energy without any intermediate conversion mechanism. The linear motor may be regarded as a rotating motor formed by radially cutting the motor and spreading out into a flat plane. The linear motor includes a linear motor, a linear motion motor, a push-rod motor, and the like.

The linear motor in the related art is composed of a rotor, a stator, an end cover, and a vibrator. The stator is fixed in the end cover, the rotor is in transmission connection with the stator, and the vibrator is mounted in the end cover. When energized, the vibrator is driven to vibrate to achieve linear motion.

However, the linear motor in the related art has limited space for movement of the vibrator. If a driving voltage is excessively high, the vibrator easily collides with an inner wall of the device that may cause abnormal noise, and adversely affect performance and reliability of the device, resulting in shortened service life of the motor.

Therefore, there is a need to provide a new dynamic protection method for a linear vibration motor to solve the above problems.

SUMMARY

The technical problem to be solved in the present disclosure is to provide a dynamic protection method for a linear vibration motor that can automatically adjust a voltage parameter, reduce a frequency of abnormal noise, and prolong the service life of the device.

In order to solve the above technical problem, the present disclosure provides a dynamic protection method for a linear vibration motor, the dynamic protection method including the following steps: S1: presetting an initial gain coefficient, and calculating an original voltage signal according to the initial gain coefficient; S2: processing the original voltage signal of each frame to acquire a current gain coefficient of a current signal frame, and obtaining a driving voltage signal through a dynamic protection algorithm, the driving voltage signal=the original voltage signal*the current gain coefficient; S3: loading the driving voltage signal to the linear vibration motor to drive the linear vibration motor to operate; S4: collecting an acceleration signal of the linear vibration motor, and analyzing, according to a preset rule, whether the acceleration signal is abnormal to determine an operating state of the linear vibration motor; if yes, performing S5; and if not, determining the current gain coefficient to be a gain coefficient of the current signal frame, and performing S6; S5: adjusting the current gain coefficient of the current signal frame to a new gain coefficient, and returning to S2 to process the current signal frame based on the new gain coefficient, the new gain coefficient=the current gain coefficient*K, where 0<K<1; and S6: determining whether the current signal frame is the last signal frame; if yes, ending the process; and if not, returning to S2 to start calculating a gain coefficient of next signal frame until gain coefficients of all signal frames are calculated.

As an improvement, in step S4, the preset rule includes a time-domain determining process and a frequency-domain determining process.

As an improvement, the time-domain determining process includes the following steps: S401: performing statistical analysis on a time-domain waveform of the acceleration signal, and obtaining an absolute value of a positive peak and an absolute value of a negative peak; S402: calculating a difference between the absolute value of the positive peak and the absolute value of the negative peak; and S403: determining whether the difference is greater than a preset absolute value threshold; if yes, determining that the acceleration signal is in an abnormal state; and if not, determining that the acceleration signal is in a normal state.

As an improvement, the time-domain determining process includes the following steps: S501: extracting an envelope of a time-domain waveform of the acceleration signal; S502: calculating a first-order difference value of the extracted envelope; S503: calculating a maximum value of an absolute value of the first-order difference value; and S504: determining whether the maximum value is greater than a preset threshold; if yes, determining that the acceleration signal is in an abnormal state; and if not, determining that the acceleration signal is in a normal state.

As an improvement, the frequency-domain determining process includes the following steps: S601: performing fast Fourier transform (FFT) on the acceleration signal to obtain a spectrum of the acceleration signal; S602: calculating an amplitude sum of the spectrum, and obtaining a ratio according to a ratio of the amplitude sum to a maximum value of the spectrum; and S603: determining whether the ratio is greater than a preset ratio threshold; if yes, determining that the acceleration signal is in a normal state; and if not, determining that the acceleration signal is in an abnormal state.

As an improvement, in step S5, the new gain coefficient=the current gain coefficient*0.9.

In a second aspect, an embodiment of the present disclosure provides a dynamic protection system for a linear vibration motor, the dynamic protection system including: a first obtaining module configured to preset an initial gain coefficient, and calculate an original voltage signal according to the initial gain coefficient; a second obtaining module configured to process the original voltage signal of each frame to acquire a current gain coefficient of a current signal frame, and obtain a driving voltage signal through a dynamic protection algorithm, the driving voltage signal=the original voltage signal*the current gain coefficient; a driving module configured to load the driving voltage signal to the linear vibration motor to drive the linear vibration motor to operate; a first determining module configured to collect an acceleration signal of the linear vibration motor, and analyze, according to a preset rule, whether the acceleration signal is abnormal to determine an operating state of the linear vibration motor; if yes, perform an adjustment module; and if not, determine the current gain coefficient to be a gain coefficient of the current signal frame, and perform a second determination; an adjustment module configured to adjust the current gain coefficient of the current signal frame to a new gain coefficient, and return to the second obtaining module to process the current signal frame based on the new gain coefficient, the new gain coefficient=the current gain coefficient*K, where 0<K<1; and a second determining module configured to determine whether the current signal frame is the last signal frame; if yes, end the process; and if not, return to the second determining module to start calculating a gain coefficient of next signal frame until gain coefficients of all signal frames are calculated.

In a third aspect, an embodiment of the present disclosure provides a computer device, the computer device includes a memory, a processor, and a dynamic protection program for a linear vibration motor stored in the memory and executable by the processor, and the processor, when executing the dynamic protection program, implements steps in the dynamic protection method for a linear vibration motor as described above.

In a fourth aspect, an embodiment of the present disclosure provides a computer-readable storage medium, the computer-readable storage medium stores a dynamic protection program for a linear vibration motor, and when the dynamic protection program is executed by a processor, steps in the dynamic protection method for a linear vibration motor as described above are implemented.

Compared with the related art, the dynamic protection method for a linear vibration motor in the present disclosure includes: presetting an initial gain coefficient, and calculating an original voltage signal according to the initial gain coefficient; processing the original voltage signal of each frame to acquire a current gain coefficient of a current signal frame, and obtaining a driving voltage signal through a dynamic protection algorithm; loading the driving voltage signal to the linear vibration motor to drive the linear vibration motor to operate; collecting an acceleration signal of the linear vibration motor, and analyzing, according to a preset rule, whether the acceleration signal is abnormal to determine an operating state of the linear vibration motor; if yes, adjusting the current gain coefficient of the current signal frame to a new gain coefficient, and returning to the step of acquiring a driving signal to process the current signal frame based on the new gain coefficient; and if not, determining the current gain coefficient to be a gain coefficient of the current signal frame, and determining whether the current signal frame is the last signal frame; if yes, ending the process; and if not, returning to the step of acquiring a driving signal to start calculating a gain coefficient of next signal frame until gain coefficients of all signal frames are calculated. Therefore, through the dynamic protection algorithm, the voltage parameter is automatically adjusted, and performance and reliability of the device are automatically improved, thereby effectively reducing the abnormal noise to prolong the service life of the device.

BRIEF DESCRIPTION OF DRAWINGS

In order to illustrate the technical solutions in the embodiments of the present disclosure more clearly, the accompanying drawings to be used in the description of the embodiments will be briefly introduced below. It is appreciated that, the accompanying drawings in the following description are only some embodiments of the present disclosure. For those of ordinary skill in the art, other accompanying drawings can be obtained based on these drawings without creative efforts. In the drawings.

DESCRIPTION OF EMBODIMENTS

The technical solutions in embodiments of the present disclosure will be clearly and completely described below with reference to the accompanying drawings in the embodiments of the present disclosure. It is appreciated that, the described embodiments are only some of the embodiments of the present disclosure, but not all of the embodiments. Based on the embodiments of the present disclosure, all other embodiments obtained by those of ordinary skill in the art without creative efforts fall within the protection scope of the present disclosure.

Embodiment 1

Referring to FIG. 1 to FIG. 11, a dynamic protection method for a linear vibration motor is provided. The dynamic protection method includes the following steps.

In step S1, an initial gain coefficient is preset, and an original voltage signal is calculated according to the initial gain coefficient.

The initial gain coefficient is 1, which is used to calculate an initial driving voltage of a first frame. This step is performed only once. The original voltage signal may be a power input voltage value, a control voltage signal, or the like.

In step S2, the original voltage signal of each frame is processed to acquire a current gain coefficient of a current signal frame, and a driving voltage signal is obtained through a dynamic protection algorithm. The driving voltage signal=the original voltage signal*the current gain coefficient.

The original voltage signal includes multiple frames of signals. Each frame of signal corresponds to a driving voltage waveform and a gain coefficient. Each frame of signal is processed, and a corresponding driving voltage signal is obtained according to each gain coefficient and through the dynamic protection algorithm.

The current gain coefficient is generated based on the original voltage signal through a dynamic gain generation algorithm. The dynamic gain generation algorithm generally involves using a gain coefficient to adjust the original voltage signal and generating the current gain coefficient for the original voltage signal. The driving voltage signal is obtained according to the original voltage signal and the current gain coefficient. The driving voltage signal is a product of the original voltage signal and the current gain coefficient.

Figure 1:
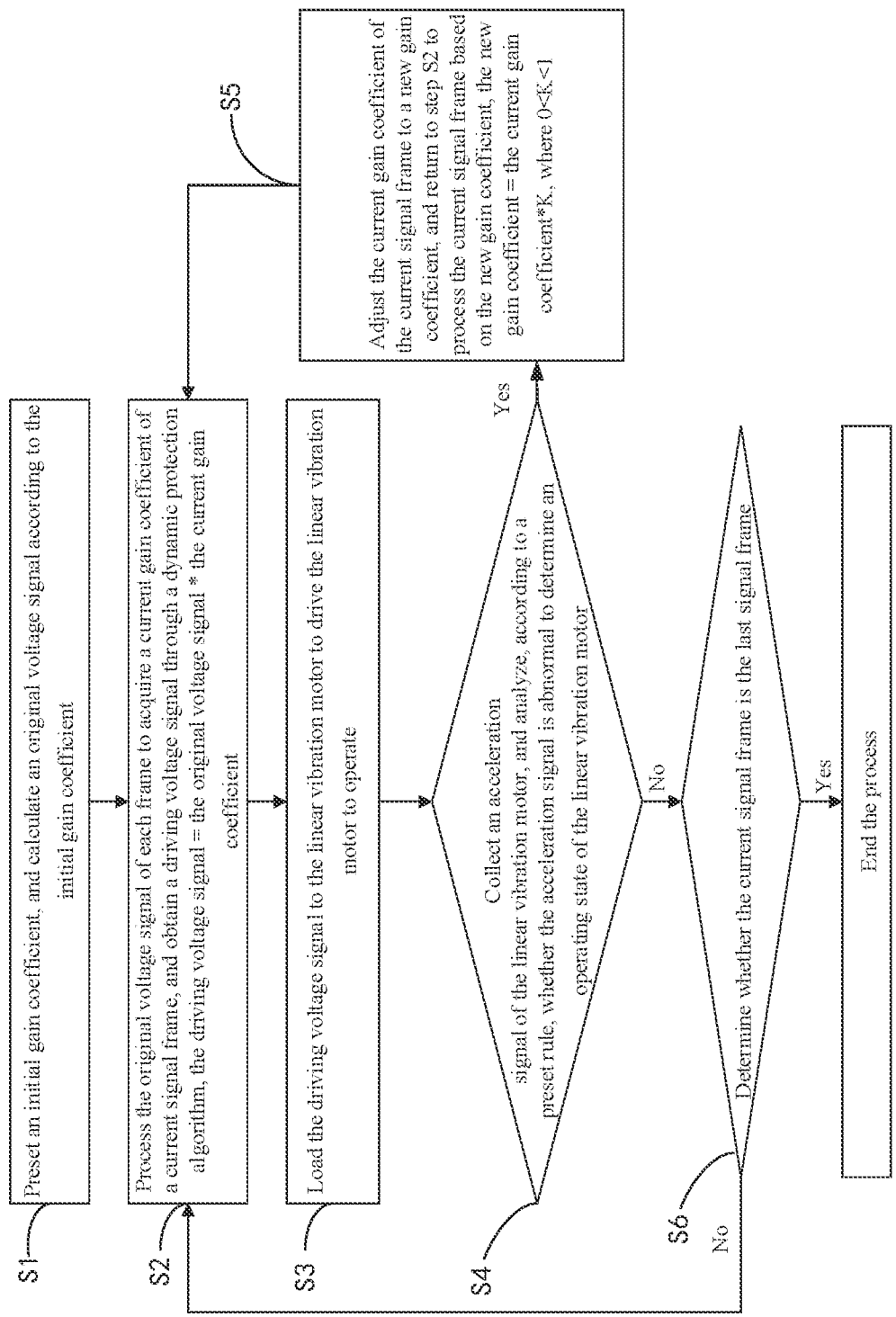
FIG. 1 is a flowchart of a dynamic protection method for a linear vibration motor according to the present disclosure.
Figure 2:
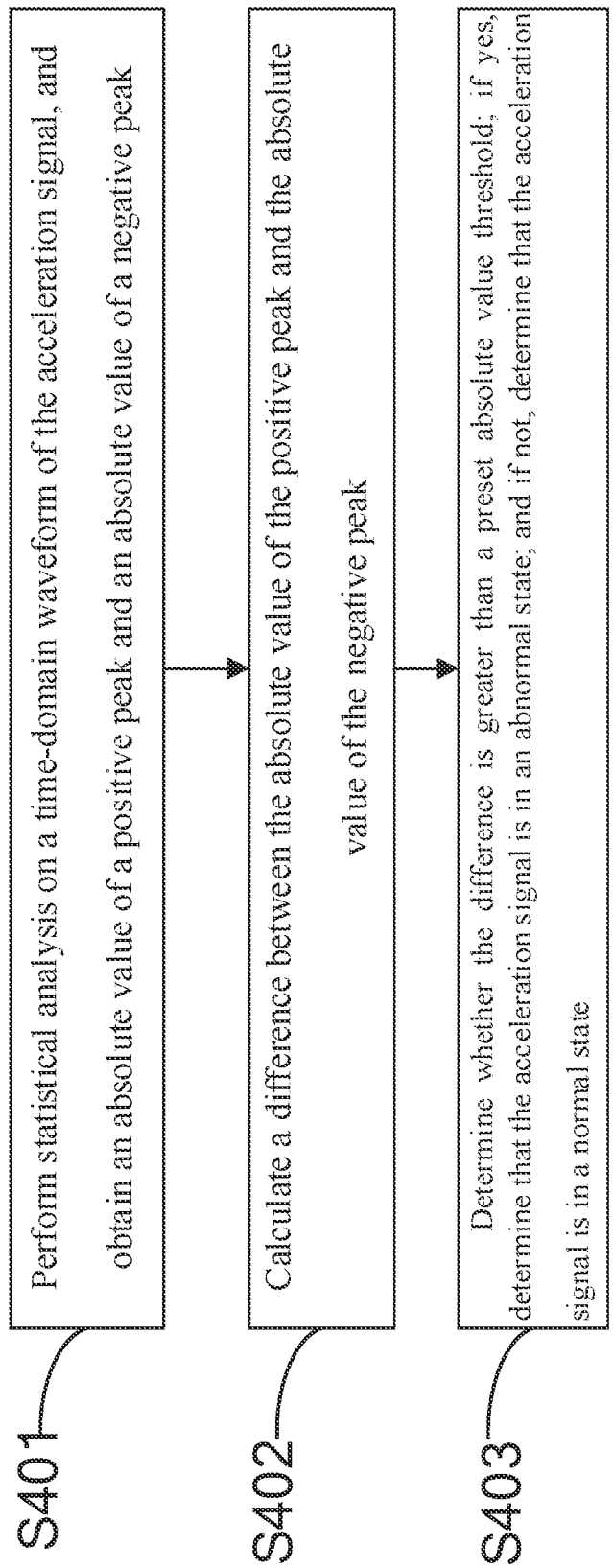
FIG. 2 is a flowchart of a time-domain determining process in step S4 in FIG. 1 according to the present disclosure.
Figure 3:
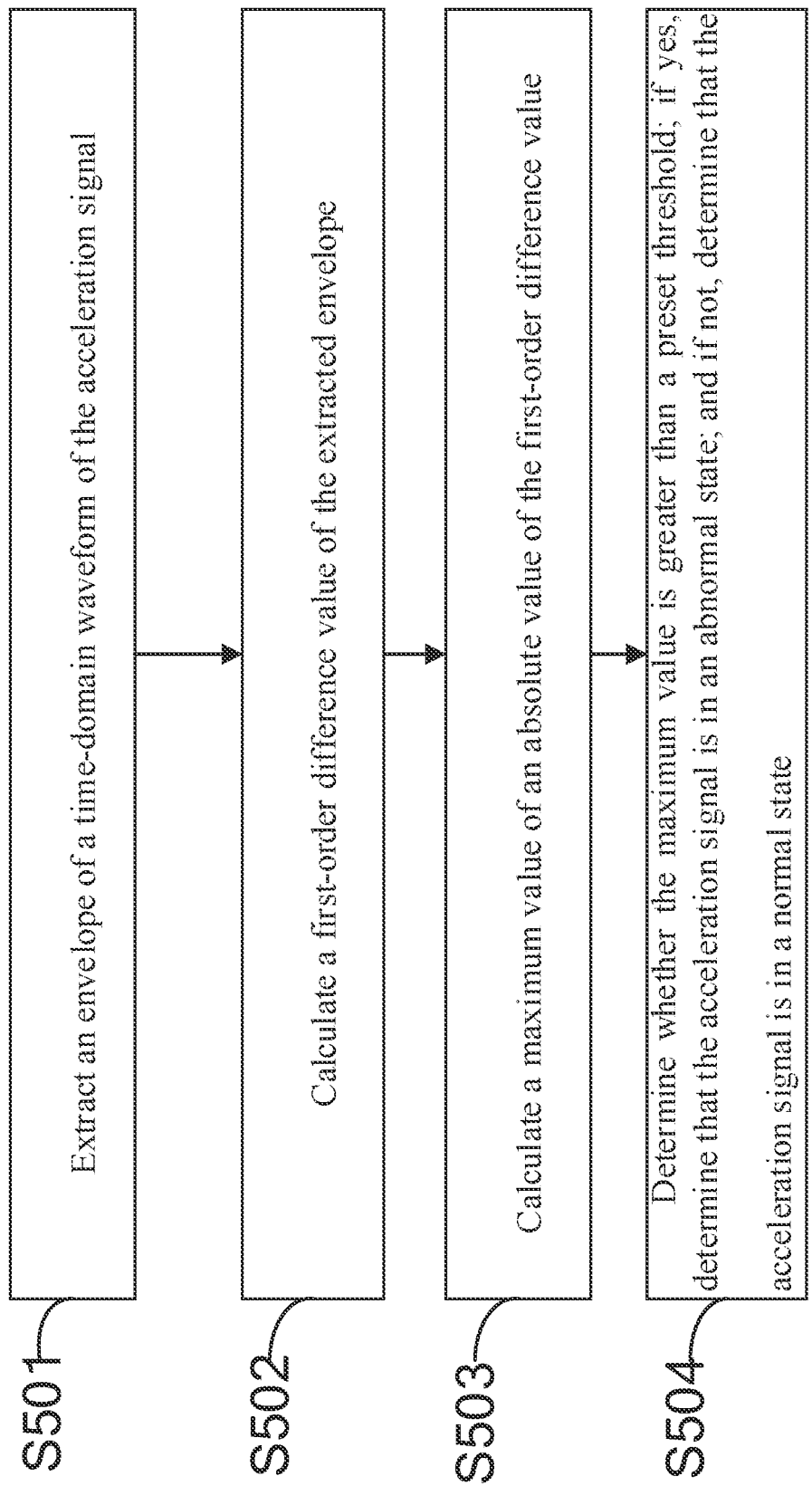
FIG. 3 is a flowchart of another time-domain determining process in step S4 in FIG. 1 according to the present disclosure.
Figure 4:
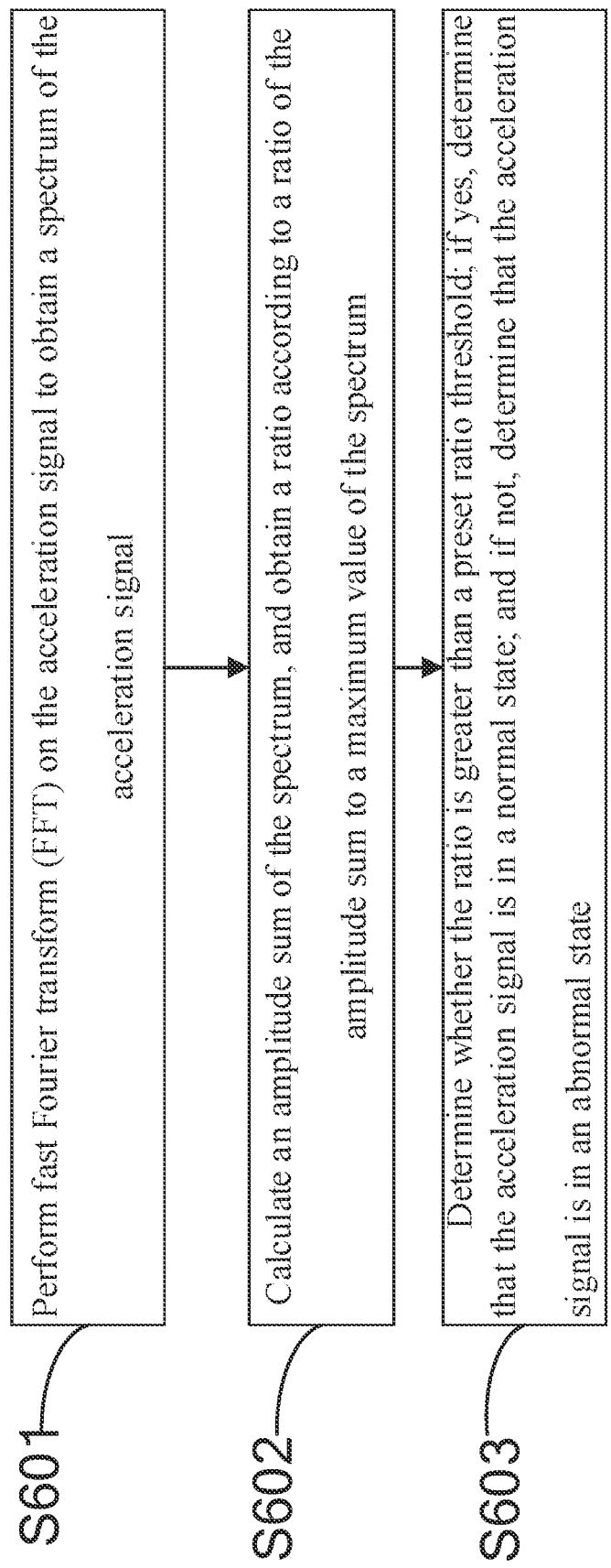
FIG. 4 is a flowchart of a frequency-domain determining process in step S4 in FIG. 1 according to the present disclosure.
Figure 5:
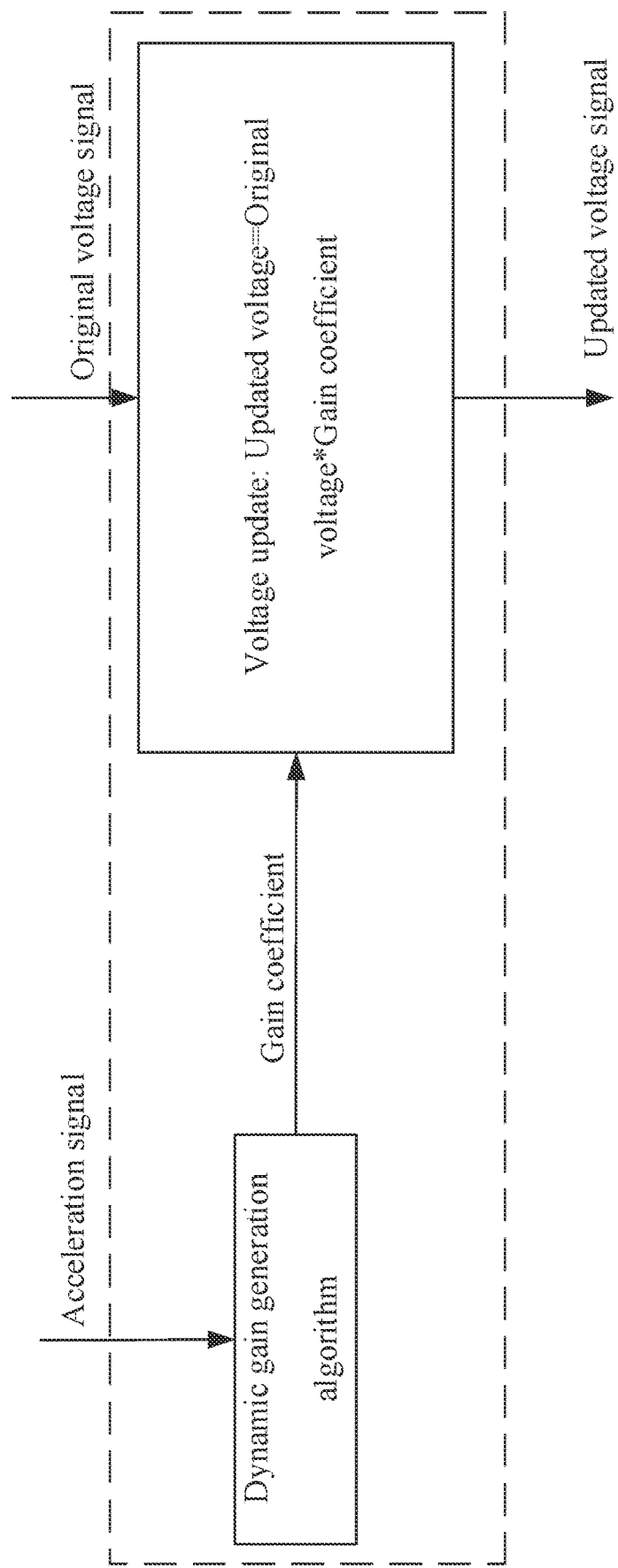
FIG. 5 is a schematic diagram of a dynamic protection algorithm according to the present disclosure.
Figure 6:
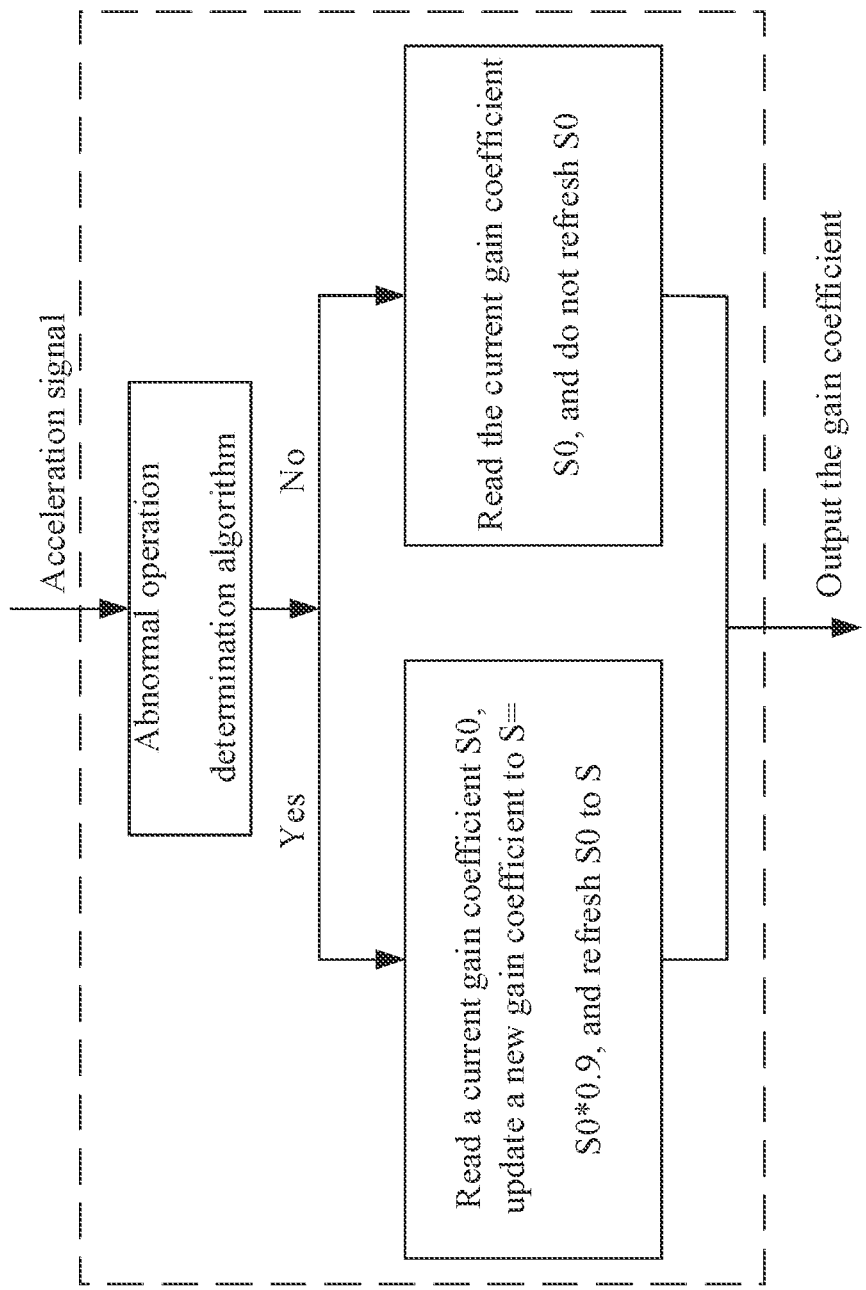
FIG. 6 is a schematic diagram of a dynamic gain generation algorithm according to the present disclosure.
Figure 7:
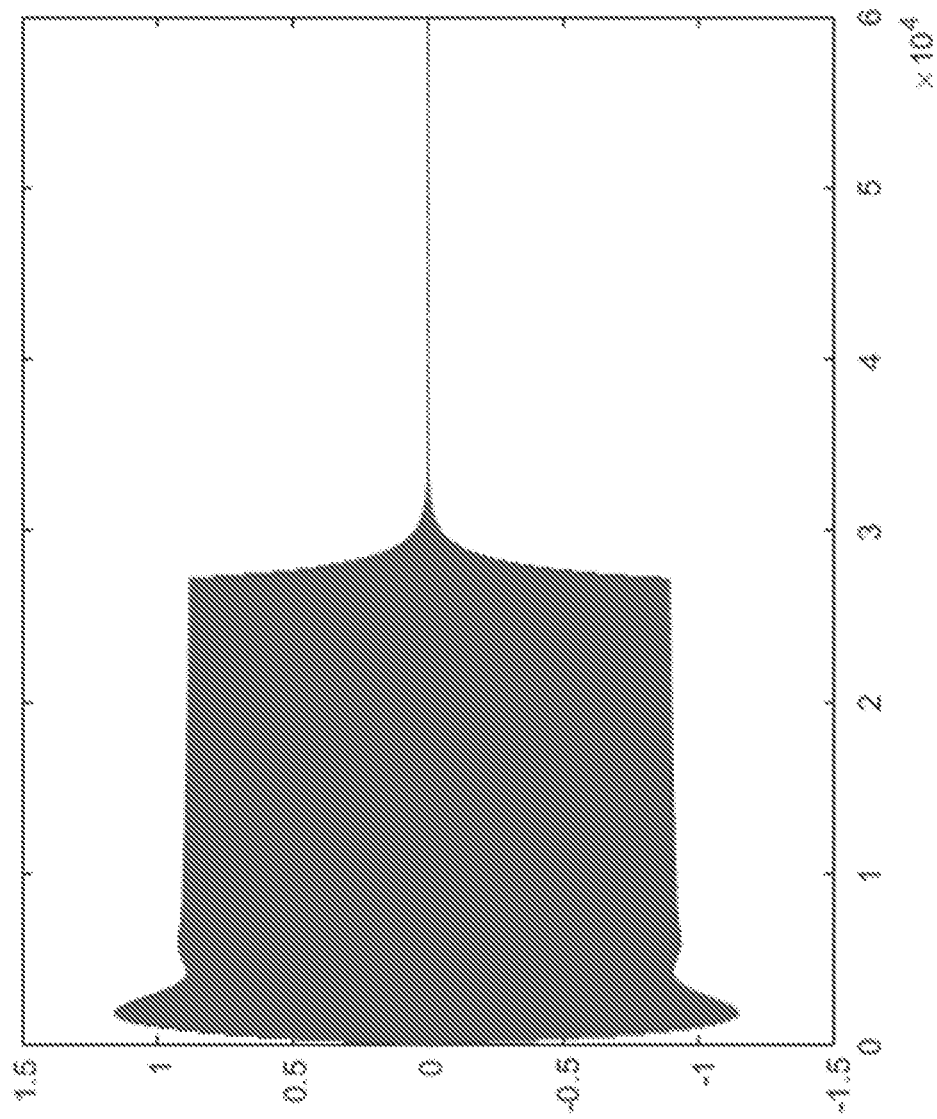
FIG. 7 is a diagram of an acceleration waveform of the linear vibration motor under normal operation according to the present disclosure.
Figure 8:
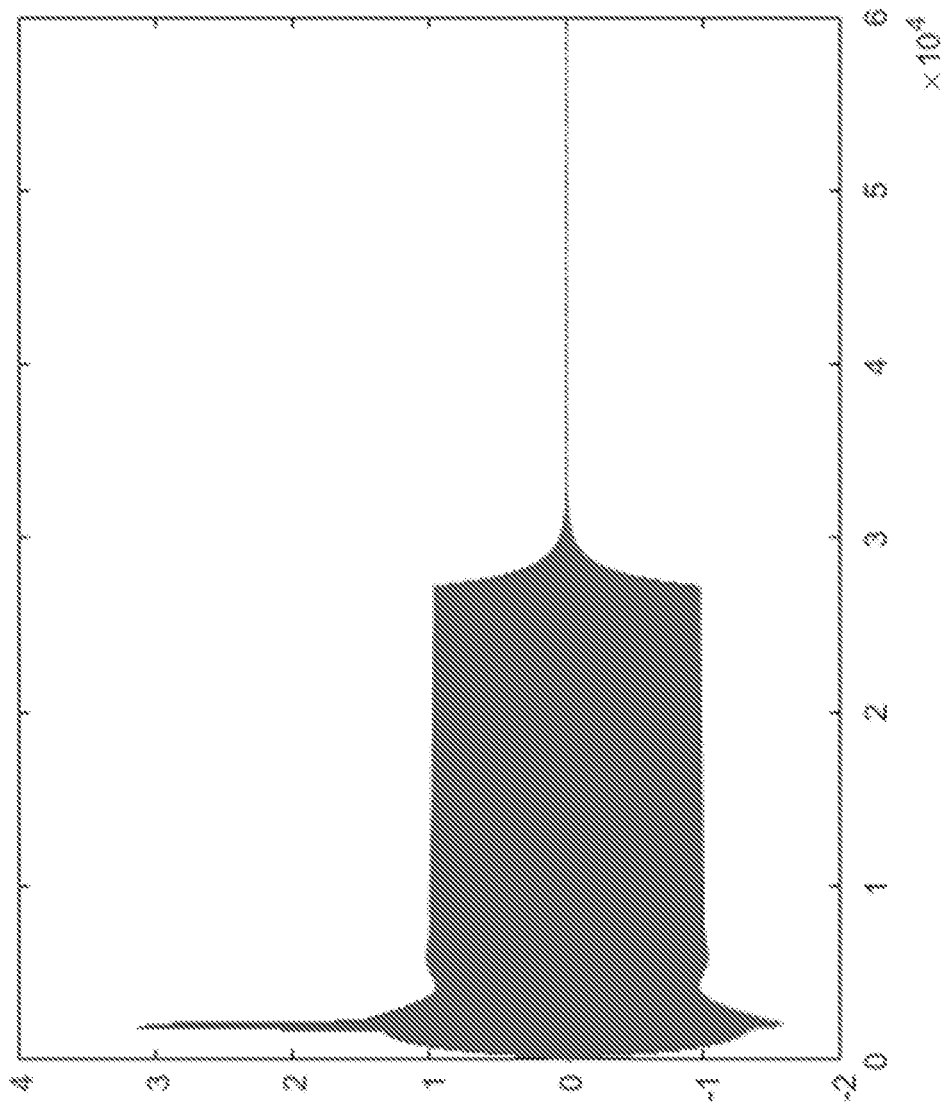
FIG. 8 is a diagram of a first acceleration waveform of the linear vibration motor under abnormal operation according to the present disclosure.
Figure 9:
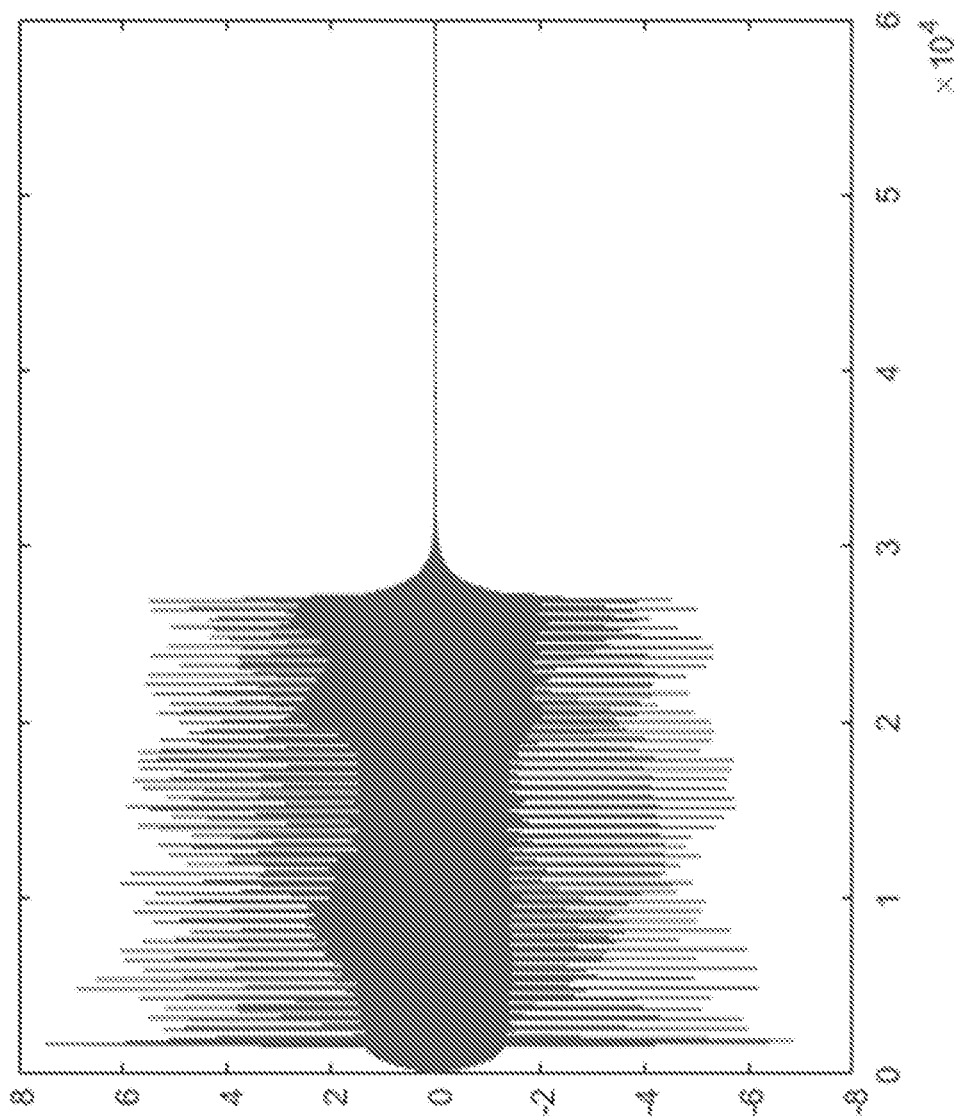
FIG. 9 is a diagram of a second acceleration waveform of the linear vibration motor under abnormal operation according to the present disclosure.
Figure 10:
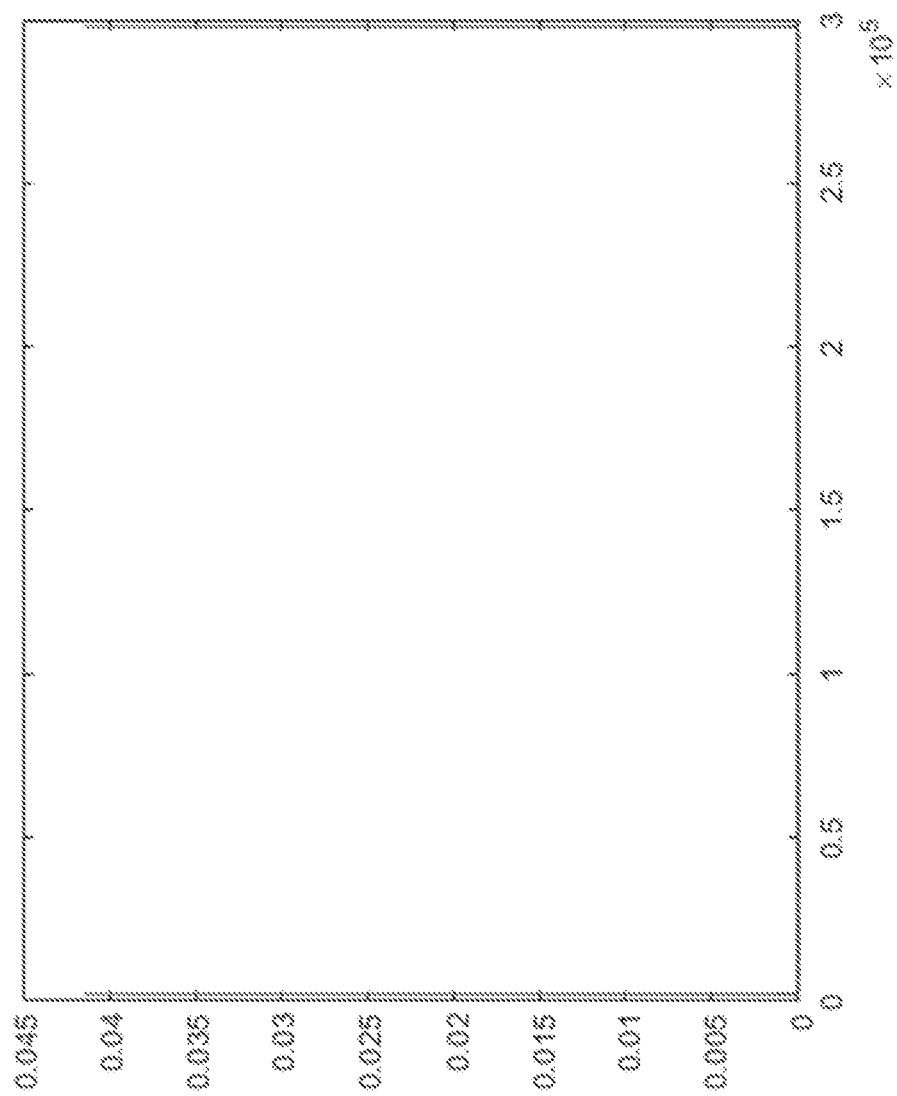
FIG. 10 is a diagram of an acceleration spectrum of the linear vibration motor under normal operation according to the present disclosure.
Figure 11:
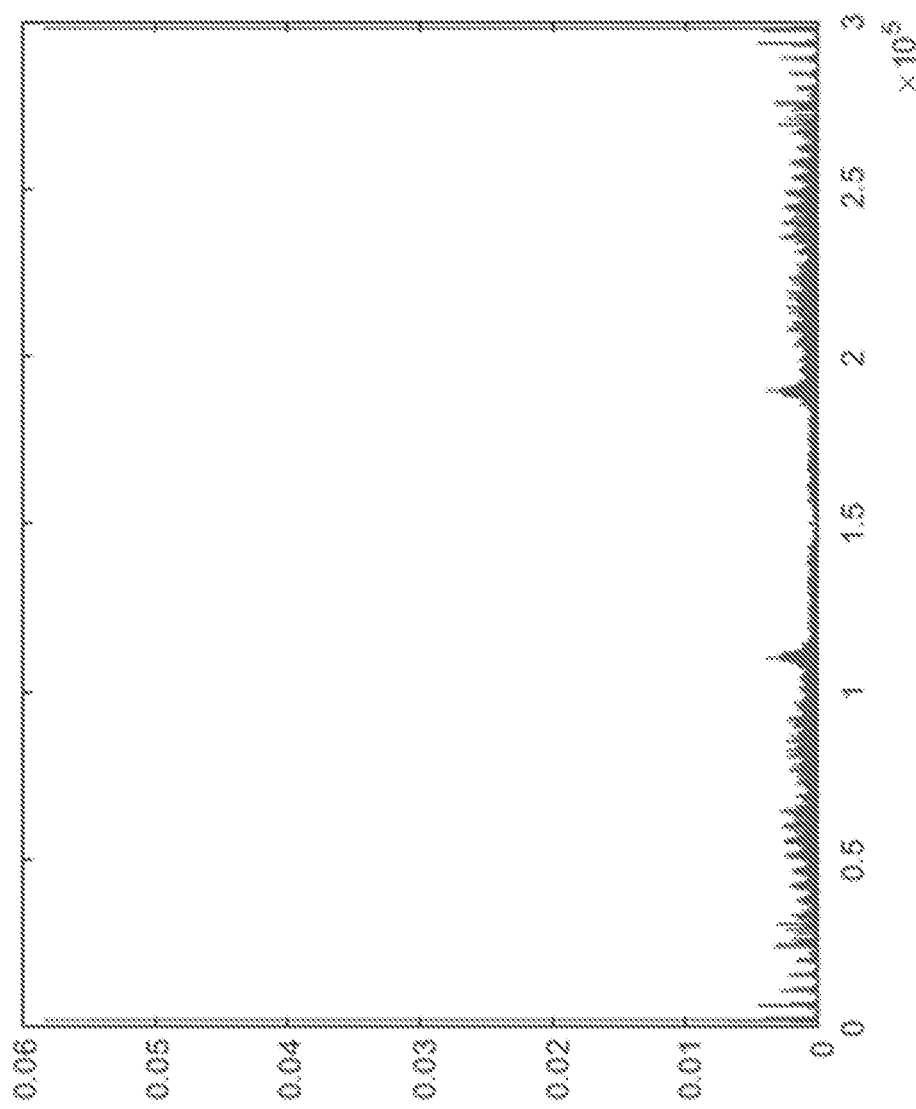
FIG. 11 is a diagram of an acceleration spectrum of the linear vibration motor under abnormal operation according to the present disclosure.

As shown in FIG. 5, in the dynamic protection algorithm, an acceleration signal and an original voltage signal are received, a gain coefficient is generated from the acceleration signal through the dynamic gain generation algorithm, the gain coefficient is combined with the original voltage signal to obtain an updated voltage signal, and the updated voltage signal is outputted to the linear vibration motor to drive the linear vibration motor to operate.

In step S3, the driving voltage signal is loaded to the linear vibration motor to drive the linear vibration motor to operate.

In step S4, an acceleration signal of the linear vibration motor is collected, and whether the acceleration signal is abnormal is analyzed according to a preset rule to determine an operating state of the linear vibration motor.

For example, assuming there are currently a total of 10 signal frames. When a first signal frame is determined to be abnormal in step S4, the first signal frame is adjusted in step S5, and the adjusted first signal frame is returned to step S2 to recalculate a voltage signal. When it is determined in step S4 that the first signal frame is not abnormal, a second signal frame is analyzed and determined. Until it is determined that a tenth signal frame is not abnormal, the process is ended.

If yes, step S5 is performed.

If not, the current gain coefficient is determined to be a gain coefficient of the current signal frame, and step S6 is performed.

In step S6, it is determined whether the current signal frame is the last signal frame.

If yes, the process is ended.

If not, the process returns to step S2 to start calculating a gain coefficient of next signal frame until gain coefficients of all signal frames are calculated.

In an abnormal operation determination algorithm, the acceleration signal is received and determined. If yes, a current gain coefficient S0 is read, a new gain coefficient is updated, the new gain coefficient is S=S0*0.9, and S0 is refreshed to S. If not, the current gain coefficient S0 is read, S0 is thus not refreshed, and a gain coefficient is outputted.

In this embodiment, in step S4, the determining includes a time-domain determining process and a frequency-domain determining process. It is found that there are significant differences in the time-domain waveform and the spectrum between the normal and abnormal operating states, a relevant algorithm is designed to capture the differences, so as to automatically identify whether the operating state is normal based on the algorithm and determine operation output of the motor based on whether the operating state is normal.

In this embodiment, the time-domain determining process includes the following steps.

In step S401, statistical analysis is performed on a time-domain waveform of the acceleration signal, and an absolute value of a positive peak and an absolute value of a negative peak are obtained.

In step S402, a difference between the absolute value of the positive peak and the absolute value of the negative peak is calculated.

In step S403, it is determined whether the difference is greater than a preset absolute value threshold.

If yes, it is determined that the acceleration signal is in an abnormal state.

If not, it is determined that the acceleration signal is in a normal state.

Upon the statistical analysis on the time-domain waveform of the acceleration signal, in the normal operating state, positive and negative values of the waveform are relatively symmetrical near a same time point. In contrary, in the abnormal operating state, the positive and negative values of the waveform are quite different near a same time point. Therefore, the difference between the absolute values of the positive and negative peaks is calculated and compared with a preset threshold, when the difference is greater than the threshold, it is determined that the acceleration signal is in the abnormal state, and when the difference is less than the threshold, it is determined that the acceleration signal is in the normal state. The threshold obtained varies due to different performance of different models of linear motors. A relatively reasonable threshold is given by collecting and analyzing a large amount of sample data, the calculated difference is compared with the absolute value threshold, the state is determined according to a comparison result, and the result is outputted when the state is normal.

In this embodiment, the time-domain determining process includes the following steps.

In step S501, an envelope of a time-domain waveform of the acceleration signal is extracted.

In step S502, a first-order difference value of the extracted envelope is calculated.

In step S503, a maximum value of an absolute value of the first-order difference value is calculated.

In step S504, it is determined whether the maximum value is greater than a preset threshold.

If yes, it is determined that the acceleration signal is in an abnormal state.

If not, it is determined that the acceleration signal is in a normal state.

The envelope of a time-domain signal is extracted, in the normal operating state, the envelope exhibits gentle and relatively smooth transformation, while in the abnormal operating state, the envelope exhibits high-frequency dramatic transformation. Therefore, the first-order difference value of the envelope is calculated, and then the maximum value of the absolute value of the first-order difference value is calculated. If the value is greater than a set threshold, it is determined that the acceleration signal is in the abnormal state. If the value is less than the threshold, it is determined that the acceleration signal is in the normal state.

In this embodiment, the frequency-domain determining process includes the following steps.

In step S601, FFT is performed on the acceleration signal to obtain a spectrum of the acceleration signal. Through the FFT, the acceleration signal can be calculated quickly, the spectrum of the acceleration signal is obtained according to the calculation, and a state of the acceleration signal is obtained through the spectrum.

In step S602, an amplitude sum of the spectrum is calculated, and a ratio is obtained according to a ratio of the amplitude sum to a maximum value of the spectrum.

In step S603, it is determined whether the ratio is greater than a preset ratio threshold.

If yes, it is determined that the acceleration signal is in a normal state.

If not, it is determined that the acceleration signal is in an abnormal state.

FFT is performed on the acceleration signal to obtain the spectrum thereof. In the normal operating state, only a few discrete frequency points have values and there is no noise interference, while in the abnormal operating state, the spectrum has values at all frequency points. A sum of amplitudes of the spectrum is calculated. If the sum is greater than a set threshold, it is determined that the acceleration signal is in the abnormal state. If the sum is less than the threshold, it is determined that the acceleration signal is in the normal state.

Optionally, when it is determined in any one of step S403, step S504, and step S603 that the state is abnormal, an abnormal signal is outputted. When it is determined in any one of step S403, step S504, and step S603 that the state is normal, no output is performed.

In step S5, the current gain coefficient of the current signal frame is adjusted to a new gain coefficient, and the process returns to step S2 to process the current signal frame based on the new gain coefficient. The new gain coefficient=the current gain coefficient*K, where 0<K<1.

In this embodiment, in step S5, the new gain coefficient=the current gain coefficient*0.9.

Compared with the related art, the dynamic protection method for a linear vibration motor in the present disclosure includes: presetting an initial gain coefficient, and calculating an original voltage signal according to the initial gain coefficient; processing the original voltage signal of each frame to acquire a current gain coefficient of a current signal frame, and obtaining a driving voltage signal through a dynamic protection algorithm; loading the driving voltage signal to the linear vibration motor to drive the linear vibration motor to operate; collecting an acceleration signal of the linear vibration motor, and analyzing, according to a preset rule, whether the acceleration signal is abnormal to determine an operating state of the linear vibration motor; if yes, adjusting the current gain coefficient of the current signal frame to a new gain coefficient, and returning to the step of acquiring a driving signal to process the current signal frame based on the new gain coefficient; and if not, determining the current gain coefficient to be a gain coefficient of the current signal frame, and determining whether the current signal frame is the last signal frame; if yes, ending the process; and if not, returning to the step of acquiring a driving signal to start calculating a gain coefficient of next signal frame until gain coefficients of all signal frames are calculated. Therefore, through the dynamic protection algorithm, the voltage parameter is automatically adjusted, and performance and reliability of the device are automatically improved, thereby effectively reducing the frequency of abnormal noise to prolong the service life of the device.

Embodiment 2

Figure 12:
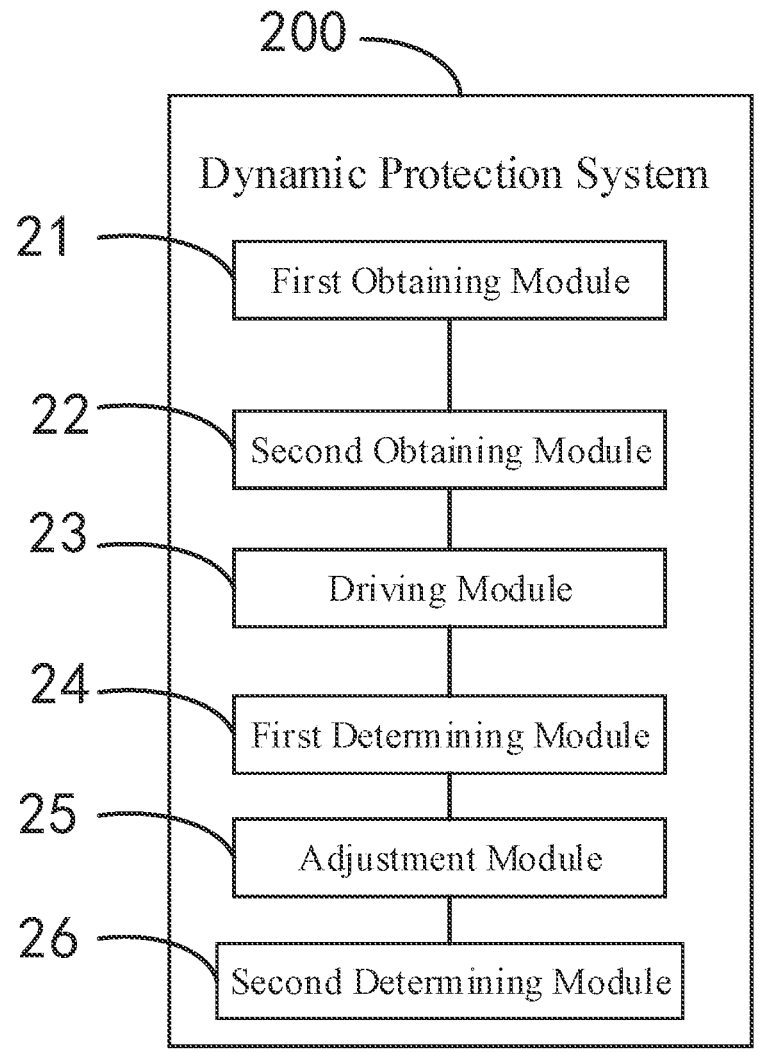
FIG. 12 is a module diagram of a dynamic protection system for a linear vibration motor according to the present disclosure.
Figure 13:
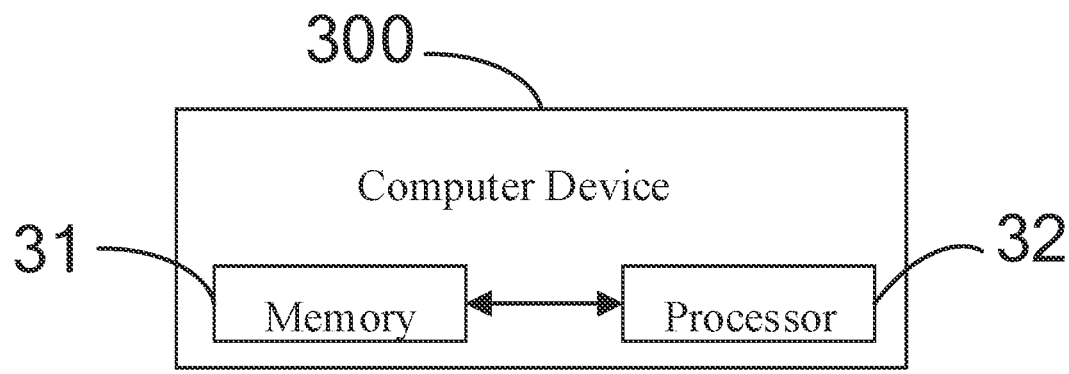
FIG. 13 is a module diagram of a computer device according to the present disclosure.

Referring to FIG. 12, an embodiment of the present disclosure provides a dynamic protection system 200 for a linear vibration motor. The dynamic protection system 200 includes: a first obtaining module 21, a second obtaining module 22, a driving module 23, a first determining module 24, an adjustment module 25, and a second determining module 26.

The first obtaining module 21 is configured to preset an initial gain coefficient, and calculate an original voltage signal according to the initial gain coefficient.

The second obtaining module 22 is configured to process the original voltage signal of each frame to acquire a current gain coefficient of a current signal frame, and obtain a driving voltage signal through a dynamic protection algorithm. The driving voltage signal=the original voltage signal*the current gain coefficient.

The driving module 23 is configured to load the driving voltage signal to the linear vibration motor to drive the linear vibration motor to operate.

The first determining module 24 is configured to collect an acceleration signal of the linear vibration motor, and analyze, according to a preset rule, whether the acceleration signal is abnormal to determine an operating state of the linear vibration motor. If yes, perform an adjustment module; and if not, determine the current gain coefficient to be a gain coefficient of the current signal frame, and perform a second determining module 26.

The adjustment module 25 is configured to adjust the current gain coefficient of the current signal frame to a new gain coefficient, and return to the second obtaining module 22 to process the current signal frame based on the new gain coefficient. The new gain coefficient=the current gain coefficient*K, where 0<K<1.

The second determining module 26 is configured to determine whether the current signal frame is the last signal frame; if yes, end the process; and if not, return to the second obtaining module 22 to start calculating a gain coefficient of next signal frame until gain coefficients of all signal frames are calculated.

Optionally, the new gain coefficient=the current gain coefficient*0.9.

In this embodiment, the initial gain coefficient of the first obtaining module 21 is 1, which is used to calculate an initial driving voltage of a first frame. This step is performed only once. The original voltage signal may be a power input voltage value, a control voltage signal, or the like.

The second obtaining module 22 generates the current gain coefficient based on the original voltage signal through a dynamic gain generation algorithm. The dynamic gain generation algorithm generally involves using a gain coefficient to adjust the original voltage signal and generating the current gain coefficient for the original voltage signal. The driving voltage signal is obtained according to the original voltage signal and the current gain coefficient. The driving voltage signal is a product of the original voltage signal and the current gain coefficient.

The first determining module 4 is configured to perform a time-domain determining process and a frequency-domain determining process. It is found that there are significant differences in the time-domain waveform and the spectrum between the normal and abnormal operating states, a relevant algorithm is designed to capture this difference, so as to automatically identify whether the operating state is normal based on the algorithm and determine operation output of the motor based on whether the operating state is normal.

In the time-domain determining process, upon the statistical analysis on the time-domain waveform of the acceleration signal, in the normal operating state, positive and negative values of the waveform are relatively symmetrical near a same time point. In contrary, in the abnormal operating state, the positive and negative values of the waveform are quite different near a same time point. Therefore, the difference between the absolute values of the positive and negative peaks is calculated and compared with a preset threshold, when the difference is greater than the threshold, it is determined that the acceleration signal is in the abnormal state, and when the difference is less than the threshold, it is determined that the acceleration signal is in the normal state. The threshold obtained varies due to different performance of different models of linear motors. A relatively reasonable threshold is given by collecting and analyzing a large amount of sample data, the calculated difference is compared with the absolute value threshold, the state is determined according to a comparison result, and the result is outputted when the state is normal.

In the time-domain determining process, an envelope of a time-domain signal is extracted, in the normal operating state, the envelope exhibits gentle and relatively smooth transformation, while in the abnormal operating state, the envelope exhibits high-frequency dramatic transformation. Therefore, the first-order difference value of the envelope is calculated, and then the maximum value of the absolute value of the first-order difference value is calculated. If the value is greater than a set threshold, it is determined that the acceleration signal is in the abnormal state. If the value is less than the threshold, it is determined that the acceleration signal is in the normal state.

In the frequency-domain determining process, FFT is performed on the acceleration signal to obtain the spectrum thereof. In the normal operating state, only a few discrete frequency points have values and there is no noise interference, while in the abnormal operating state, the spectrum has values at all frequency points. A sum of amplitudes of the spectrum is calculated. If the sum is greater than a set threshold, it is determined that the acceleration signal is in the abnormal state. If the sum is less than the threshold, it is determined that the acceleration signal is in the normal state.

In this embodiment, the technical effect and the principle achieved by the dynamic protection system for a linear vibration motor are the same as those achieved by the dynamic protection method for a linear vibration motor provided in Embodiment 1 in the present disclosure. Details are not described herein again.

Embodiment 3

Referring to FIG. 1 to FIG. 11, and FIG. 13, an embodiment of the present disclosure provides a computer device 300. The computer device 300 includes a memory 31, a processor 32, and a dynamic protection program for a linear vibration motor stored in the memory 31 and executable by the processor 32. The processor 32, when executing the dynamic protection program for a linear vibration motor, implements steps in the dynamic protection method for a linear vibration motor as described above.

In step S1, an initial gain coefficient is preset, and an original voltage signal according to the initial gain coefficient is calculated.

In step S2, the original voltage signal of each frame is processed to acquire a current gain coefficient of a current signal frame, and a driving voltage signal is obtained through a dynamic protection algorithm. The driving voltage signal=the original voltage signal*the current gain coefficient.

In step S3, the driving voltage signal is loaded to the linear vibration motor to drive the linear vibration motor to operate.

In step S4, an acceleration signal of the linear vibration motor is collected, and whether the acceleration signal is abnormal is analyzed according to a preset rule to determine an operating state of the linear vibration motor.

If yes, step S5 is performed.

If not, the current gain coefficient is determined to be a gain coefficient of the current signal frame, and step S6 is performed.

In step S5, the current gain coefficient of the current signal frame is adjusted to a new gain coefficient, and the process returns to step S2 to process the current signal frame based on the new gain coefficient. The new gain coefficient=the current gain coefficient*K, where 0<K<1.

In step S6, it is determined whether the current signal frame is the last signal frame.

If yes, the process is ended.

If not, the process returns to step S2 to start calculating a gain coefficient of next signal frame until gain coefficients of all signal frames are calculated.

The memory 31 may be used to store software programs and various data. The memory 31 may mainly include a program storage region and a data storage region. The program storage region may store an operating system, an application required by at least one function (such as a sound playing function and an image displaying function), and the like. The data storage region may store data (such as audio data and a phone book) created according to use of a mobile phone. In addition, the memory 31 may include a high-speed random access memory, and may also include a non-volatile memory, such as at least one magnetic disk storage device, a flash memory device, or other volatile solid-state storage devices.

The processor 32 is a control center of a terminal, which uses various interfaces and lines to connect various parts of the entire terminal, and executes various functions of the terminal and processes data by running or executing software programs and/or modules stored in the memory 31 and calling data stored in the memory 31, so as to monitor the terminal as a whole. The processor 32 may include one or more processing units. Optionally, the processor 32 may integrate an application processor and a modem processor. The application processor mainly processes an operating system, a user interface, applications, and the like. The modem processor mainly deals with wireless communication. It may be understood that the above modem processor may not be integrated into the processor 32.

It is to be noted that, in use, the computer device 300 can achieve the technical effect achieved by the dynamic protection method for a linear vibration motor as described above. Refer to the description in the dynamic protection method for a linear vibration motor above for details, which are not described herein again.

Embodiment 4

An embodiment of the present disclosure provides a computer-readable storage medium. The computer-readable storage medium stores a dynamic protection program for a linear vibration motor, and when the dynamic protection program for a linear vibration motor is executed by a processor, steps in the dynamic protection method for a linear vibration motor as described above are implemented.

The computer-readable storage medium is, for example, a read-only memory (ROM), a random access memory (RAM), a magnetic disk, an optical disc, or the like.

It is to be noted that, herein, the terms such as "comprise", "include", and any variants thereof are intended to cover a non-exclusive inclusion, so that a process, method, item, or apparatus including a series of elements includes not only those elements but also other elements not expressly listed or elements inherent to the process, method, item, or apparatus. Without further limitations, an element defined by the statement "comprising/including a/an . . . " does not exclude the presence of additional identical elements in the process, method, item, or apparatus that includes the element.

Through the above description of the embodiments, those skilled in the art can clearly understand that the methods in the above embodiments can be implemented by software plus a necessary general hardware platform, which may certainly be implemented by hardware, but in many cases the former is better. Based on such understanding, the technical solution of the present disclosure essentially or the part that contributes to the related art can be embodied in the form of a software product. The computer software product is stored in a storage medium (such as a ROM/RAM, a magnetic disk, or an optical disc), and includes several instructions to cause a terminal (which may be a mobile phone, a computer, a server, an air conditioner, a network device, or the like) to perform the methods described in the various embodiments of the present disclosure.

The above are merely the embodiments of the present disclosure. It should be noted herein that, for those of ordinary skill in the art, improvements can be made without departing from the creative concept of the present disclosure, but these all fall within the protection scope of the present disclosure.

What is claimed is:

1. A dynamic protection method for a linear vibration motor, comprising following steps:
    S1: presetting an initial gain coefficient, and calculating an original voltage signal according to the initial gain coefficient;
    S2: processing the original voltage signal of each frame to acquire a current gain coefficient of a current signal frame, and obtaining a driving voltage signal through a dynamic protection algorithm, wherein the driving voltage signal=the original voltage signal*the current gain coefficient;
    S3: loading the driving voltage signal to the linear vibration motor to drive the linear vibration motor to operate;
    S4: collecting an acceleration signal of the linear vibration motor, and analyzing, according to a preset rule, whether the acceleration signal is abnormal to determine an operating state of the linear vibration motor;
        if yes, performing S5; and
        if not, determining the current gain coefficient to be a gain coefficient of the current signal frame, and performing S6;
    S5: adjusting the current gain coefficient of the current signal frame to a new gain coefficient, and returning to S2 to process the current signal frame based on the new gain coefficient, wherein the new gain coefficient=the current gain coefficient*K, where 0<K<1; and
    S6: determining whether the current signal frame is the last signal frame;
        if yes, ending the process; and
        if not, returning to S2 to start calculating a gain coefficient of next signal frame until gain coefficients of all signal frames are calculated.

2. The method as described in claim 1, wherein, in S4, the preset rule comprises a time-domain determining process and a frequency-domain determining process.

3. The method as described in claim 2, wherein the time-domain determining process comprises following steps:
    S401: performing statistical analysis on a time-domain waveform of the acceleration signal, and obtaining an absolute value of a positive peak and an absolute value of a negative peak;
    S402: calculating a difference between the absolute value of the positive peak and the absolute value of the negative peak; and
    S403: determining whether the difference is greater than a preset absolute value threshold;
        if yes, determining that the acceleration signal is in an abnormal state; and
        if not, determining that the acceleration signal is in a normal state.

4. The method as described in claim 2, wherein the time-domain determining process comprises following steps:
    S501: extracting an envelope of a time-domain waveform of the acceleration signal;
    S502: calculating a first-order difference value of the extracted envelope;
    S503: calculating a maximum value of an absolute value of the first-order difference value; and
    S504: determining whether the maximum value is greater than a preset threshold;
        if yes, determining that the acceleration signal is in an abnormal state; and
        if not, determining that the acceleration signal is in a normal state.

5. The method as described in claim 2, wherein the frequency-domain determining process comprises following steps:
    S601: performing fast Fourier transform (FFT) on the acceleration signal to obtain a spectrum of the acceleration signal;
    S602: calculating an amplitude sum of the spectrum, and obtaining a ratio according to a ratio of the amplitude sum to a maximum value of the spectrum; and
    S603: determining whether the ratio is greater than a preset ratio threshold;
        if yes, determining that the acceleration signal is in a normal state; and
        if not, determining that the acceleration signal is in an abnormal state.

6. The method as described in claim 1, wherein, in S5, the new gain coefficient=the current gain coefficient*0.9.

7. A computer device, wherein the computer device comprises a memory, a processor, and a dynamic protection program for a linear vibration motor stored in the memory and executable by the processor, and the processor, when executing the dynamic protection program, implements steps in the method as described in claim 1.

8. A dynamic protection system for a linear vibration motor, comprising:
    a first obtaining module configured to preset an initial gain coefficient, and calculate an original voltage signal according to the initial gain coefficient;
    a second obtaining module configured to process the original voltage signal of each frame to acquire a current gain coefficient of a current signal frame, and obtain a driving voltage signal through a dynamic protection algorithm, wherein the driving voltage signal=the original voltage signal*the current gain coefficient;
    a driving module configured to load the driving voltage signal to the linear vibration motor to drive the linear vibration motor to operate;

a first determining module configured to collect an acceleration signal of the linear vibration motor, and analyze, according to a preset rule, whether the acceleration signal is abnormal to determine an operating state of the linear vibration motor;
  if yes, perform an adjustment module; and
  if not, determine the current gain coefficient to be a gain coefficient of the current signal frame, and perform a second determination;
an adjustment module configured to adjust the current gain coefficient of the current signal frame to a new gain coefficient, and return to the second obtaining module to process the current signal frame based on the new gain coefficient, wherein the new gain coefficient=the current gain coefficient*K, where $0<K<1$; and
a second determining module configured to determine whether the current signal frame is the last signal frame;
  if yes, end the process; and
  if not, return to the second determining module to start calculating a gain coefficient of next signal frame until gain coefficients of all signal frames are calculated.

* * * * *